(12) United States Patent
Hauser

(10) Patent No.: US 8,327,385 B2
(45) Date of Patent: Dec. 4, 2012

(54) SYSTEM AND METHOD FOR RECORDING WEB PAGE EVENTS

(75) Inventor: Robert R Hauser, Frisco, TX (US)

(73) Assignees: Suboti, LLC, Frisco, TX (US); Paul A Lipari, Frisco, TX (US)

( * ) Notice: Subject to any disclaimer, the term of this patent is extended or adjusted under 35 U.S.C. 154(b) by 848 days.

(21) Appl. No.: 12/435,748

(22) Filed: May 5, 2009

(65) Prior Publication Data

US 2010/0287566 A1    Nov. 11, 2010

(51) Int. Cl.
*G06F 13/00* (2006.01)

(52) U.S. Cl. ........................................ 719/318; 709/231

(58) Field of Classification Search .................. 719/318; 709/231
See application file for complete search history.

(56) References Cited

U.S. PATENT DOCUMENTS

| | | | |
|---|---|---|---|
| 6,363,435 B1 * | 3/2002 | Fernando et al. ............. | 719/318 |
| 6,512,519 B1 * | 1/2003 | Arsenault et al. ............. | 345/441 |
| 6,848,108 B1 | 1/2005 | Caron | |
| 6,865,599 B2 * | 3/2005 | Zhang ............................ | 709/218 |
| 7,028,306 B2 * | 4/2006 | Boloker et al. ................ | 719/310 |
| 7,051,042 B2 | 5/2006 | Krishnaprasad et al. | |
| 7,284,192 B2 * | 10/2007 | Kashi et al. .................... | 715/232 |
| 7,958,234 B2 * | 6/2011 | Thomas et al. ................ | 709/224 |

OTHER PUBLICATIONS

Florian Mueller, Andrea Lockerd, "Cheese: Tracking Mouse Movement Activity on Websites, a Tool for User Modeling", Conference on Human Factors in Computing Systems, CHI '01 extended abstracts on Human factors in computing systems, Seattle, Washington, Session: Short talks: of mice and measures, pp. 279-280, Year of Publication: 2001, ISBN: 1-58113-340-5, MIT Media Lab, 2001, Cambridge, MA 02139 USA.

* cited by examiner

*Primary Examiner* — Andy Ho

(57) ABSTRACT

Unobserved user interface events may be detected based on upon previously recorded data streams of events. The prior data streams are obtained by recording events from users who have browsers that support both event capturing and bubbling. When users with browsers that support only event bubbling interact with the page, the data stream is augmented by inferring unobserved events based on similarity to other event stream records.

20 Claims, 9 Drawing Sheets

```
50
   <html>
   <head>
51    <meta http-equiv="content-type" content="text/html; charset=UTF-8">
   <title>Example Web Page</title>
   <head>

<body>
     <div>Some div text.<br>
52    <span id="span1">Some span text.</span>
   </div>
   <a id="link1" href="alink.html">A link</a>
   <body>

<scrip language="javascript" type="text/javascript">
   var x = document.getElementById('span1');
53 x.onclick = function(e) {
   if (!e) var e = window.event;
   alert('application code'); // Application code (handles event)
   e.cancelBubble = true;  // Application code (halts event)
   if (e.stopPropagation) e.stopPropagation();
   };
   <script>

<script language="javascript" type="text/javascript" src="eventtracker.js"></
54 script>
   </html?
```

Figure 5

SYSTEM AND METHOD FOR RECORDING WEB PAGE EVENTS

FIELD OF THE INVENTION

This invention relates to a system and method for recording events generated for a web page operating in a web browser.

BACKGROUND OF THE INVENTION

In typical webpage protocols, a document object model (DOM) of a webpage structure may include a document, a body and several elements, including elements embedded within each other. Events, in particular user triggered events such as cursor movements, mouse clicks or keyboard events may be generated at various locations on the page. Application code running in the webpage environment may register event handlers on various web page objects. Web browsers may allow event handlers to handle events in a variety of ways. A first event handling method is referred to as event capturing. Event capturing provides an event first to the top most object in the web page hierarchical structure and onward in a descending fashion as follows:

DOCUMENT→BODY→ELEMENT A→ELEMENT B

Event bubbling provides an event first to the bottom most object and onward in an ascending fashion as follows:

ELEMENT B→ELEMENT A→BODY→DOCUMENT

An event listener will often stop propagation of an event, for example on a webpage where a "click" event on ELEMENT A does something different to a "click" on ELEMENT B.

In some cases, a second application, such as a JavaScript resource, may be added to the webpage. This second application may need to observe events that originate on the webpage. However, a problem may emerge if the first application uses and does not propagate various events.

What is required is an improved system, method and computer readable medium for providing event handling.

SUMMARY OF THE INVENTION

In one aspect of the disclosure, there is provided a method for inferring unobserved events generated during an interaction with a web page comprising detecting at least one event for the web page on a first web browser, providing the at least one event to a database, determining at least one event context associated with the at least one event in the database, and inferring one or more undetected events from the event context.

In one aspect of the disclosure, there is provided a system comprising a server and at least one application operatively associated with the server and configured to record a first event stream of a first event stream type and a second event stream of a second event stream type from a first type of a web browser during an interaction on a web page and to provide the first event stream and the second event stream to the server. The server is configured to determine events present in the first event stream that are unobserved in the second event stream and add at least a portion of the first event stream and the second event stream as a training context to a set of one or more training examples.

In one aspect of the disclosure, there is provided a computer-readable medium comprising computer-executable instructions for execution by a processor, that, when executed, cause the processor to receive a first event stream, and determine at least one event that is identified in an event capture portion of the first event stream and that is not identified in an event bubbling portion of the first event stream.

BRIEF DESCRIPTION OF THE DRAWINGS

The invention will now be described, by way of example only, with reference to specific embodiments and to the accompanying drawings in which:

FIG. 5 illustrates an example of a web page.

DETAILED DESCRIPTION OF THE INVENTION

Figure 7:
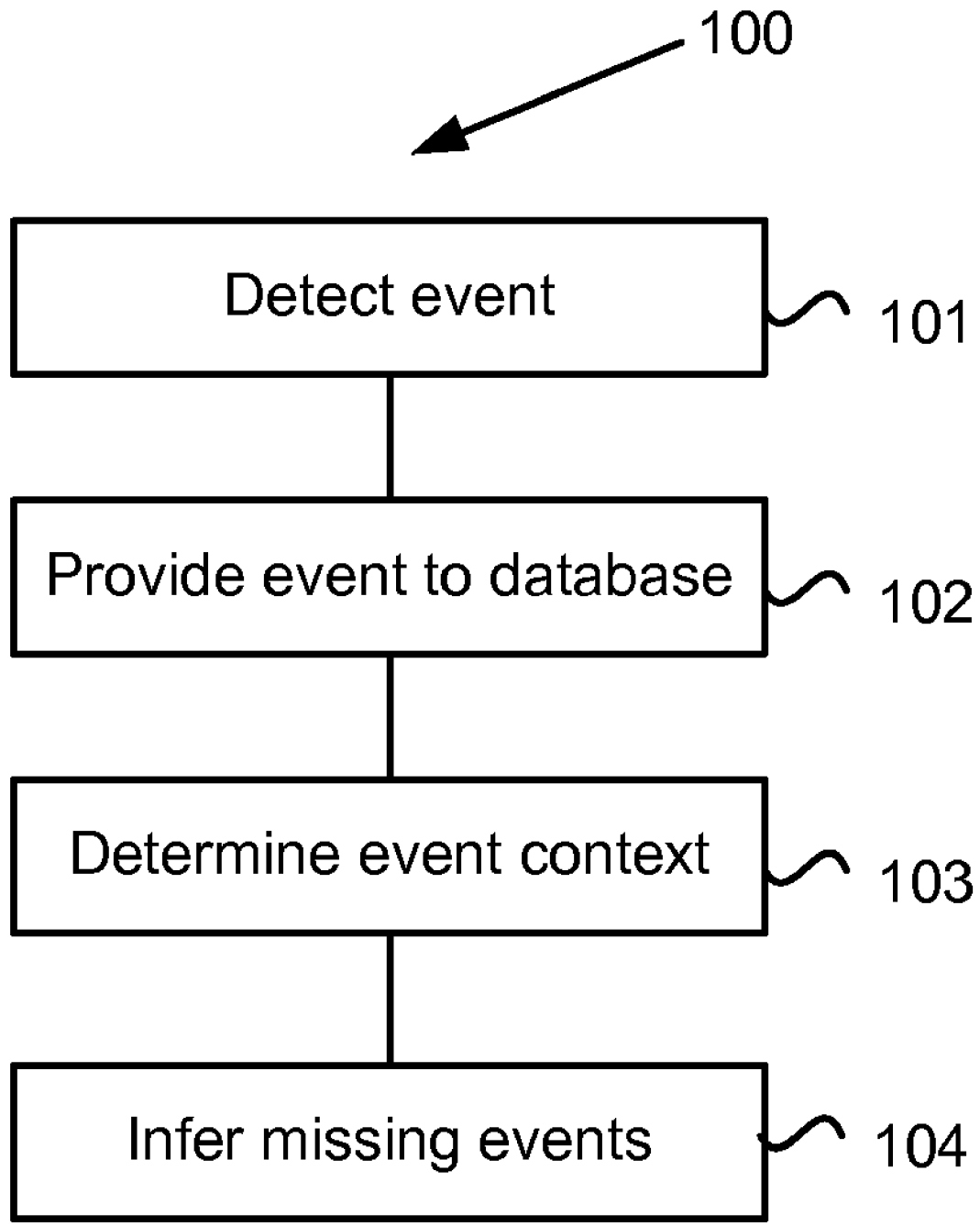
FIG. 7 illustrates a method of an embodiment of the disclosure.

In one embodiment, this disclosure proposes a method to solve the problem of recording unobserved user interface events. The method relies upon previously recorded data streams of events. In one embodiment, these prior data streams are obtained by recording events from users who have browsers that support both event capturing and bubbling (Browser A). When users with Browser B interact with the page, the data stream is augmented by inferring unobserved events based on similarity to other event stream records. A method in accordance with an embodiment of the disclosure is depicted in the flowchart 100 of FIG. 7. At step 101, an event is detected on a webpage which is then passed to a database at step 102. At step 103, an event context for the event is determined and one or more missing events are inferred at step 104.

Figure 1:
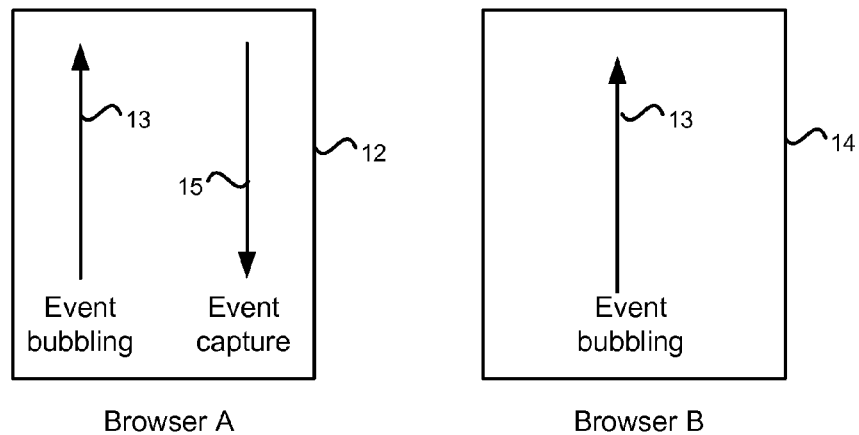
FIG. 1 illustrates alternative web browser types.

In general, there are two types of web browsers as illustrated in FIG. 1. A first type of browser 12, Browser A, provides both event capturing 15 and event bubbling 13. A second type of browser 14, Browser B, provides only event bubbling 13. Firefox is an example of Browser A whereas Internet Explorer is an example of Browser B.

Figure 2:
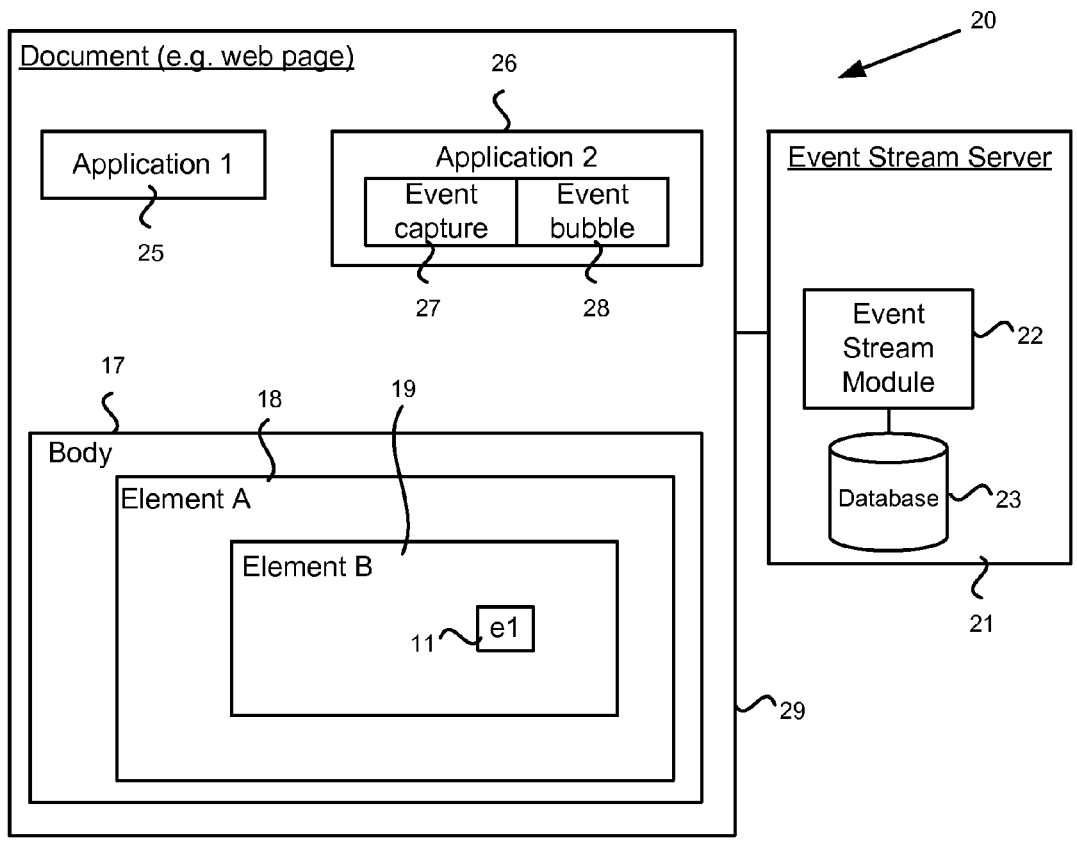
FIG. 2 schematically illustrates a system in accordance with an embodiment of the disclosure.

A system 20 in accordance with an embodiment of the disclosure is illustrated in FIG. 2. The system includes an event stream server 21 that includes an event stream module 22 as will be described in greater detail below. The event stream server 21 may be operatively associated with an application 26 that operates on a webpage 29 within a client browser. In one example, the webpage may provide a document 29, body 17, Element A 18 and Element B 19 embedded within Element A. The webpage 29 may also include a first application 25 and a second application 26. Typically, the applications may be javascript applications, though other types of applications may be apparent to a skilled addressee.

The second application 26 may be an event listener and can include a first event handler 27 at the top of the Document Object Model (DOM) that can be established to detect all events for an event capture phase. A second event handler 28 at the top of the DOM can be established to detect all events appearing to the second application in an event bubble phase. Data storage, for example for storing captured event streams etc, may be provided as part of the client, the server, part of the client and the server, and/or off-board (i.e. off of the client or the server).

Figure 3:
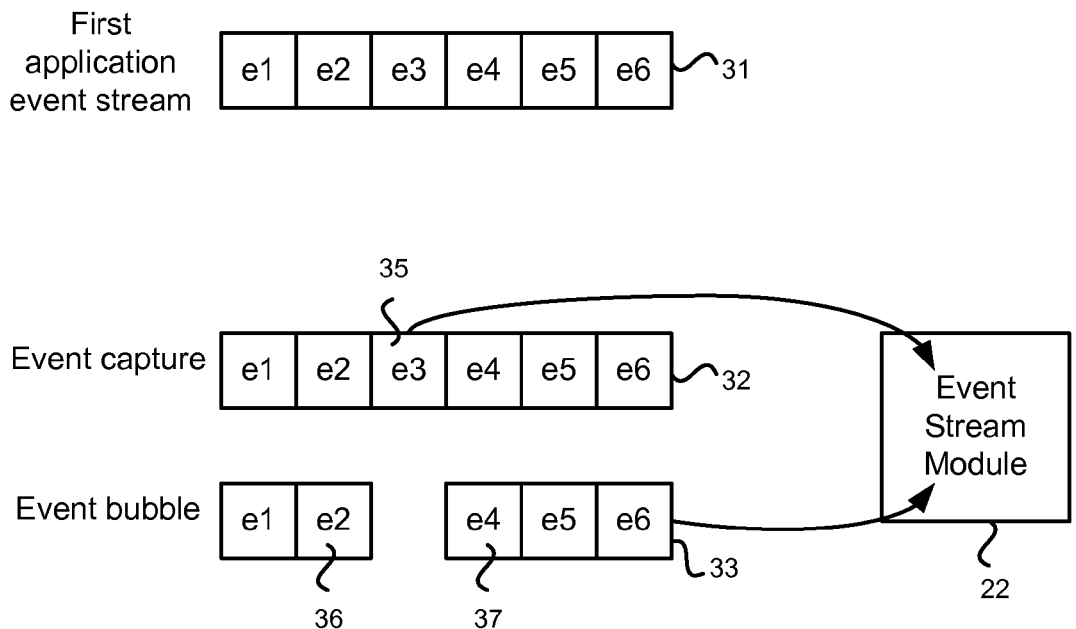
FIG. 3 illustrates event recording with a first browser type.
Figure 4:
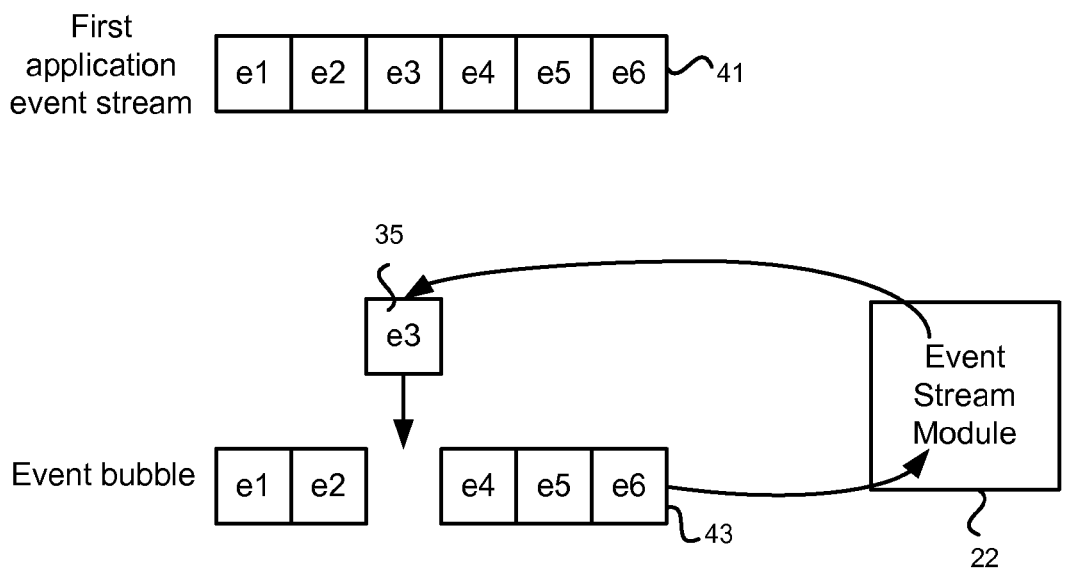
FIG. 4 illustrates event recording with a second browser type.

In a first instance, the webpage 29 may be utilized by a user using Browser A which supports both event capture and event bubbling. Events such as event "e1" 11 may be generated within the Element B 19 of the webpage 29. Multiple events form an event stream. As shown in FIG. 3, an event stream 31 of a first application may include events e1, e2 . . . e6 that occur during use of the webpage 29. The first application 25 may have event handlers (not shown) for detecting and responding to events generated in respect of the first application. In addition, the "capture" event handler 27 of the second application 26 will detect each of events e1, e2, . . . e6 to produce a capture event stream 32 for the second application 26. The "bubble" event handler 28, relying on event bubbling, will detect each of the events 31 that are propagated by the first application 25 to produce a bubble event stream 33. In the present example, event e3 35 is consumed by the first application 25 and so is detected by the capture event handler 27 of the second application 26 but is not detected by the bubbling event handler 28 of the second application 26.

A single interaction with the webpage may include an event header message and a plurality of event stream messages. These messages are passed to the server 21 for analysis by the event stream module 22. The server 21 compares the capture event stream 32 and the bubble event stream 33. In the comparison, the omission of events in the bubble event stream, such as event e3, are detected and recorded, for example in the database 23 of the server 21. The consumed events may be recorded along with their context. In one embodiment the event context may include the bubble event stream 33 of any events that are not consumed by the first application, i.e. those events that do reappear to the second application. In one embodiment, the event context may include a subset of the event stream 33 such as the events before 36 and after 37 the missing event. In one embodiment, the event context may include both the event capture stream and the event bubble stream.

In a second instance, the webpage may be presented to a user running Browser B. In utilizing the webpage, the user may generate the same event stream 41 as for the first instance of the webpage shown in FIG. 3. However, because Browser B supports only event bubbling and does not support event capture, the second application only generates an event bubble stream 43. The event bubble stream 43 does not include event e3 because event e3 is consumed by the first application. Thus, in this case, i.e. for browsers that support only event bubbling, the second application submits the event bubble stream to the server for processing.

The server analyzes the event bubble stream 43 by comparing one or more events of the event stream with events and event contexts stored within a suitable data store such as mentioned above. Based on the analysis, the server is able to infer that an event may have been consumed by the first application and not propagated into the event bubble stream of the second application. The server can therefore return any missing events from the data store, such as event e3 35, in order to complete the event stream 43.

In one embodiment, an event bubble stream may be submitted to the event stream server for analysis. Thus, an event stream such as event stream 43 including events e1, e2, e4, e5, e6 may have been previously stored as a context of missing event e3. The server thus returns e3 35 to the event stream, or returns a complete event stream including events e1, e2, e3, e4, e5, e6.

In one embodiment, subsets of the bubble event stream may be submitted to the event stream server for analysis. For example, when the second application detects event e2, event e2 may be submitted to the server for analysis. Event e2 may exist within several of the event contexts stored in the database. For example, a first event context may be e2, e3, e4 and a second event stream may be e2, e7. Thus the server may return several scenarios. For example, if the next event of the event bubble stream is event e4, the server may infer that an event e3 is missing. However, if a next event of the event bubble stream is event e7, then the server may infer that no event is missing.

Figure 6:
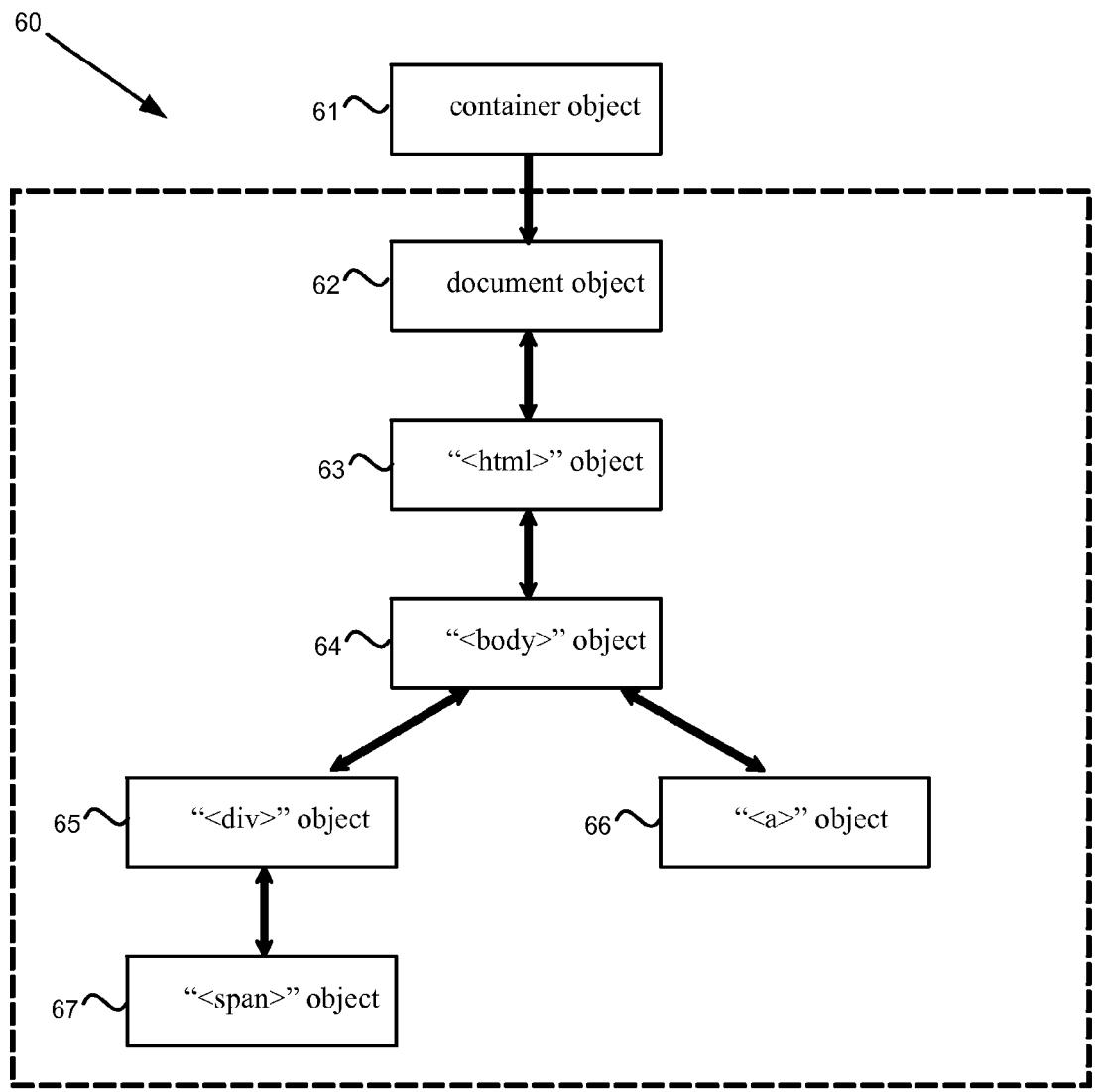
FIG. 6 illustrates an example of a Document Object Model for the web page of FIG. 5.

An illustrative web page is shown in FIG. 5. The document object model 60 for the webpage 50 is shown in FIG. 6.

The example web page has four top level elements:
1. The <head> element 51.
2. The <body> element 52 which is the primary content of the page.
3. A <script> element 53 that illustrates application code that has been developed for this web page. In this example, the application code simply pops up an alert box when the <span> element is clicked on. As is typical for application code, the application registers an event handler on the bubbling phase of event handling and also halts the propagation of the event.
4. A <script> element 54, referring to a resource 'event-tracker.js', which performs event tracking within the web page and its application code, that is, it implements the behavior of Application 2 (26).

The script elements, the application code or the event tracker can be internal (e.g. first <script> element) or external (e.g. second <script> element). Also, the application code can reside in many scripts. The event tracker functionality can likewise reside in many scripts.

There are several methods by which a "bubbling" event handler can be registered. The "traditional" model is illustrated but any bubbling phase event handler registration is intended to be encompassed herein.

In one embodiment, the event tracker functionality provided by eventtracker.js, performs the following:
1. Registers event handlers on objects of the DOM for bubbling phase in an unobtrusive manner. Objects may include all objects 62-67 of the DOM 60 and the DOM's container object 61 or some subset thereof. Event handlers may be registered for all of the possible event types or some subset thereof.
2. If the execution environment (e.g. web browser) allows for event handling during the capturing phase of event propagation then the handler is also registered on the DOM object for the event capturing phase. The handler function registered may be the same or different from the handler registered in step 1.
3. The event handlers registered on the DOM record information about any events seen. This information may include, but is not limited to: the event type; the event propagation phase (capturing or bubbling); the DOM object (and corresponding HTML page element) that the handler is attached to; the mouse position; the time which may be absolute time, delta time since script start, or delta time since last event, etc.

4. Information recorded by all handlers in step 3 is collected into a data stream. The information may be collected into a buffer, collected over a network, periodically sent over the network to a server, which may be the same server as the original page, and/or periodically sent to a different server.

In a specific example, provided for illustrative purposes only, a datastream may be collected in step 4 above on the webpage 50 when event handlers are registered for two types of events, the 'click' and 'mousedown' events. The user performs the action of clicking the mouse button on the displayed text "Some span text" which is provided in the body 52 of the webpage 50 of FIG. 5 and is represented by element 67 in the DOM 60 of FIG. 6.

In this example, not all collected data is shown. The data that is shown includes three fields separated by ':'. In the first field, a 'C' or 'B' indicates if the event was seen during the Capturing event propagation phase or the Bubbling event propagation phase. The second field specifies the name of the DOM object the event handler is attached to ("undefined" corresponds to the container object 61 holding the DOM). The third field specifies the type of event.

Event Data Stream For Browser A:
1. [C:undefined:mousedown]
2. [C:#document:mousedown]
3. [C:HTML:mousedown]
4. [C:BODY:mousedown]
5. [C:DIV:mousedown]
6. [C:SPAN:mousedown]
7. [B:SPAN:mousedown]
8. [B:DIV:mousedown]
9. [B:BODY:mousedown]
10. [B:HTML:mousedown]
11. [B:#document:mousedown]
12. [B:undefined:mousedown]
13. [C:undefined:click]
14. [C:#document:click]
15. [C:HTML:click]
16. [C:BODY:click]
17. [C:DIV:click]
18. [C:SPAN:click]

Event Data Stream For Browser B:
1. [B:DIV:mousedown]
2. [B:BODY:mousedown]
3. [B:HTML:mousedown]
4. [B:#document:mousedown]

Browser A supports both event propagation phases (capturing and bubbling) whereas Browser B supports only event bubbling. The 'click' event generated by the user is visible to the event tracker event handlers during the capturing phase of event propagation. Application code handles the 'click' event on the <span> element and chooses to halt the propagation of the event. For Browser B direct observation of the user generated 'click' event is difficult.

However, when the event stream produced using Browser A is generated, the omission of the "click" event in the bubbling phase is identified. Therefore, a record is created that associates the missing "click" event with the event stream generated by Browser A.

When the event data stream of Browser B is generated, the event stream is provided to the server for analysis. The server searches for matching records, and identifies a match having significant similarity to a previously recorded data stream having the same user interaction and allowing direct observation of the 'click' event (Browser A). Specifically, Browser B's events 1-4 correspond to another user's interaction with the page on Browser A, events 8-11.

Because the bubble event stream generated in Browser A is associated with missing events that are observed only through the capturing phase, when the same bubble event stream is generated in Browser B, the missing event, i.e. the "click" event, can also be identified and supplemented.

The similarity increases greatly when additional events are tracked (e.g. 'mouseup', 'mousemove'). Therefore, by comparing the event stream recorded by Browser B with a stored event stream, the full context of the event stream of Browser B may be inferred.

Figure 8:
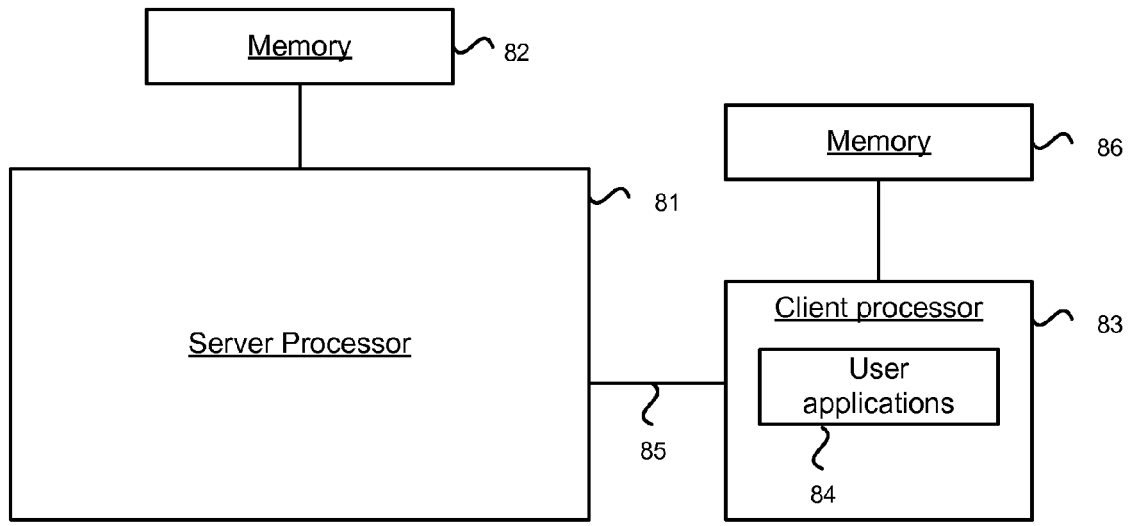
FIG. 8 illustrates a server processor and a user processor.
Figure 9:
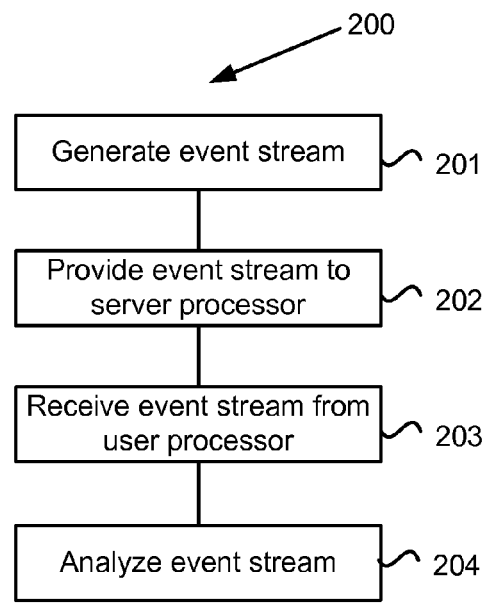
FIG. 9 illustrates an instruction set that may be executed on the processors of FIG. 8.

In one embodiment, the server 21 of FIG. 2 may include at least one processor 81 operatively associated with at least one memory 82, as shown in FIG. 8. The memory 82 may store instructions that are executable on the processor 81. The processor 81 may be in communication with a processor 83 of a client, such as a user operating the applications 84 on a web browser as described above. The user processor 83 may also be operatively associated with a memory 86 that stores an instruction set for execution by the user processor 83. The server processor 81 may communicate with the user processor 83 through an appropriate communications link 85 such as the internet. An instruction set that may be executed on the processors 81, 83 is depicted in the flowchart 200 of FIG. 9. In the combined instruction set, the user processor 83 generates an event stream at step 201. At step 202, the user processor 83 provides the event stream to the server processor 81 which receives the event stream at step 203. The server processor 81 then analyzes the event stream at step 204. Analyzing the event stream determines any events that are identified in an event capture portion of the event stream that are not identified in an event bubbling portion of the event stream.

While the server is depicted as a single entity, a person skilled in the art will readily understand that the server may be provided as multiple servers or with multiple components and in a distributed form.

Figure 10:
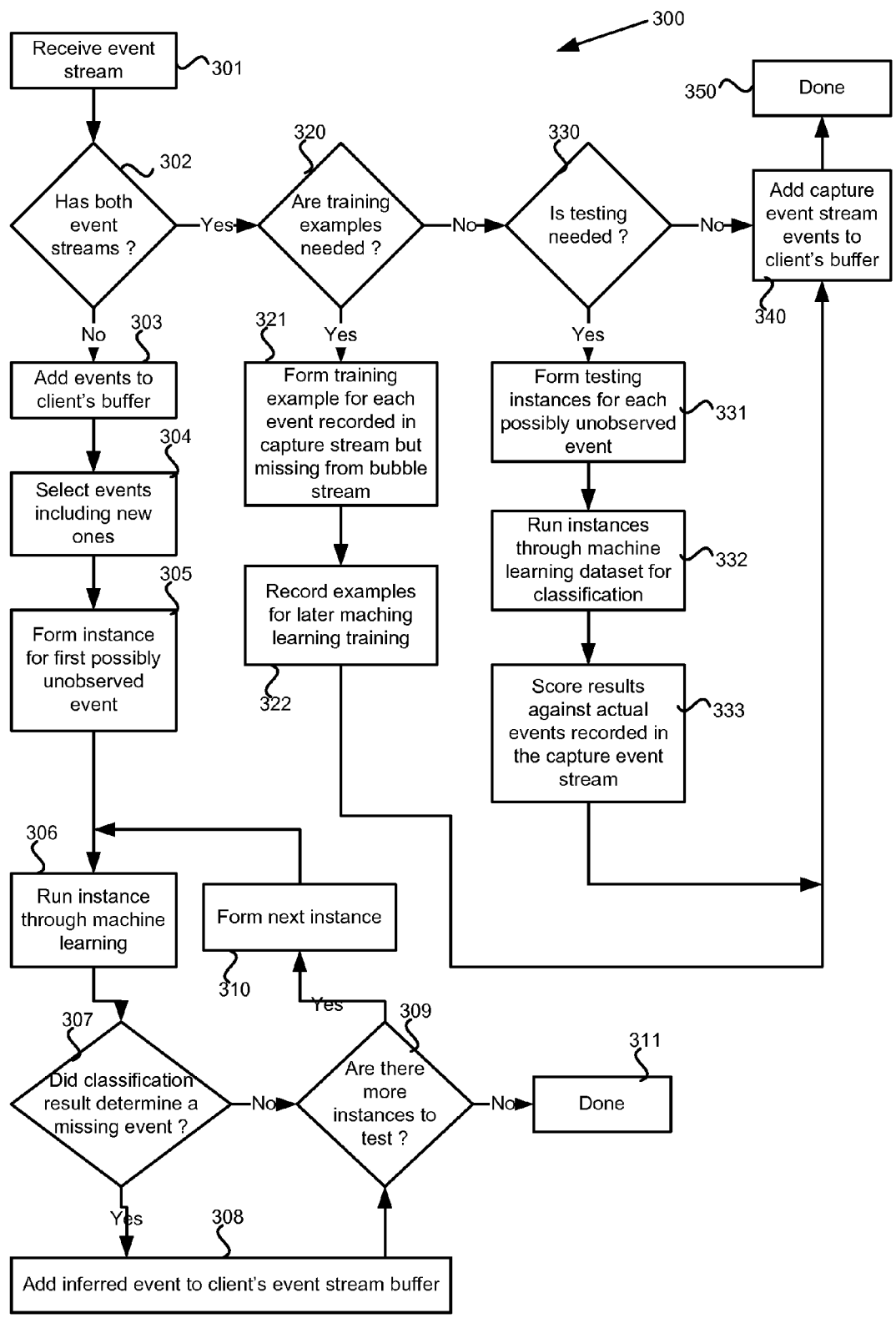
FIG. 10 illustrates a flow chart for operation of the event stream module.

A detailed operation of the event stream module 22 will now be described with reference to the flowchart 300 of FIG. 10. At step 301, the event stream module 22 receives a recorded event stream. If the module determines at step 302 that the event stream contains only bubble events, then the module proceeds to an event inferring process. As a first step of the event inferring process, the recorded events are added to the client's buffer (303). At step 304, events that may be unobserved are determined and a first one of the possibly unobserved events is selected. An instance for that event is then formed as will be described in greater detail below. The instance that is formed may include a plurality of event contexts and features. The instance is then classified at step 306 by running through a machine learning process where the instance is compared with previously formed training examples. If the classification of the instance determines that events are missing from the event stream, then decision tree 307 moves to add the inferred events to the client's event stream buffer at step 308. If the classification at step 306 determines no events are missing, then decision tree 307 moves to decision tree 309 and determines if more instances are required to be tested, e.g. whether there are other possibly unobserved events to be tested. If more instances exist, then the next instance is formed at step 310 and the classification step 306 is repeated. If no more instances exist, then processing of the event stream is completed 311.

If the event stream module 22 determines at step 302 that the event stream has both bubble event streams and capture event streams, then the event stream module determines if training examples are needed for that particular event stream on that application (e.g. for that webpage) 320. If training examples are required, then a training example is formed at step 321 for each event recorded in the capture stream but missing from the bubble stream. Forming of the training examples will be described in greater detail below. The training examples are then recorded 322 for later machine learning training. The capture event stream events are then added to the client's buffer at step 340.

If decision tree 320 determines that no training example are required then the event stream module proceeds to decision tree 330 to determine if testing is needed. If testing is required, then testing instances are formed at step 331 for each possibly unobserved event. The instances are then run through a machine learning dataset for classification 332. The results are then scored 333 against actual events recorded in the capture event stream. Once testing is complete, the capture stream events are added to the client's buffer 340 and the process is complete 350.

The event stream module may periodically check the testing scores, retrain the machine learning as well as update the active testing dataset. In addition, a predetermined number of the best datasets may be stored for use in the classification, both at testing and at runtime when classifying possibly unobserved events in the bubble event only event streams.

Figure 11:
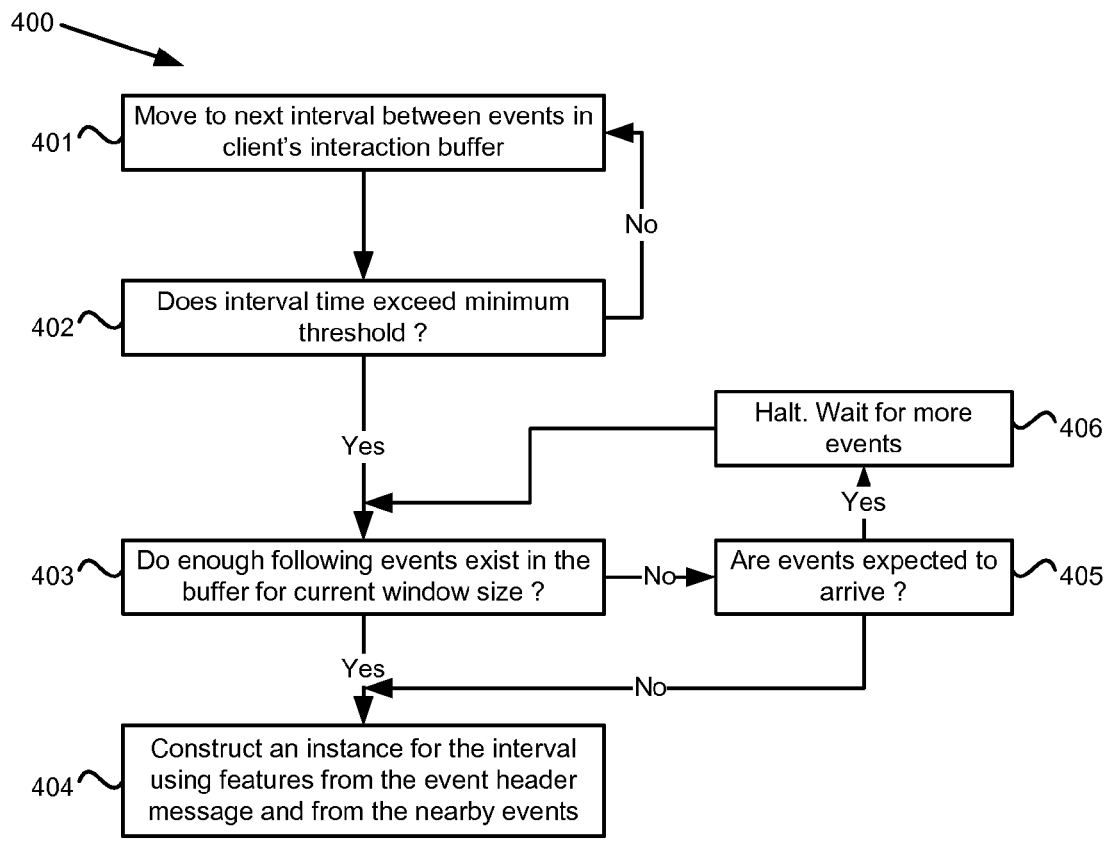
FIG. 11 illustrates a flowchart for instance processing.
Figure 12:
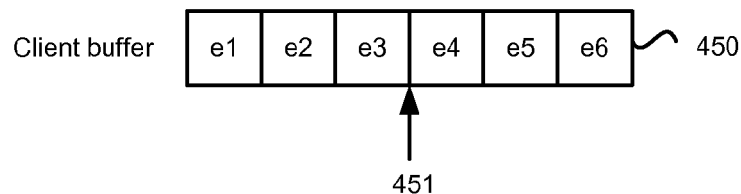
FIG. 12 illustrates a client buffer depicting an event interval.

A process for forming the event instance at step 305 will now be described with reference to the flowchart 400 of FIG. 11 and the client's event buffer 450 shown in FIG. 12. At step 401, a next event interval to be evaluated is determined and selected. For example, if the last interval evaluated was the interval between event e2 and event e3, then the evaluation moves to the interval 451 between events e3 and e4. A threshold may be provided for efficiency. If the time interval between two 'click' events is shorter than the fastest performing human clicking the mouse then there is no need to test for a missing 'click' event in that interval. Similarly for keypress events and to some degree for mouse move events. Thresholds may be determined from training examples with known human interactions. If the time interval 451 does not exceed the threshold 402, then the process returns to step 401 and moves to the next event interval. If the time interval 451 is greater than the threshold then the process determines 403 whether sufficient following events exist in the buffer for the current window size. If there are insufficient events and more events are expected to arrive 405 then the process waits for more events 406 before returning to step 403. Once sufficient events exist in the client buffer, an instance is constructed using features from the event header message and from the nearby events, such as the events within the "window size" number of events away from the interval being tested. For example, if the window size is 3, and the interval being evaluated is interval 451 between event e3 and event e4 in FIG. 12, then a contextual instance is formed using features from the event header message and features from the event e3. These features may include the event type (e.g. click, mousedown, mouse move) the x/y location in the viewport of the event, the time between this and the next event etc. Next, features from the event e2 are added to the instance, then features from events e1, e4, e5, and e6. That is, all events within the window size (3) are used for constructing the instance.

Figure 13:
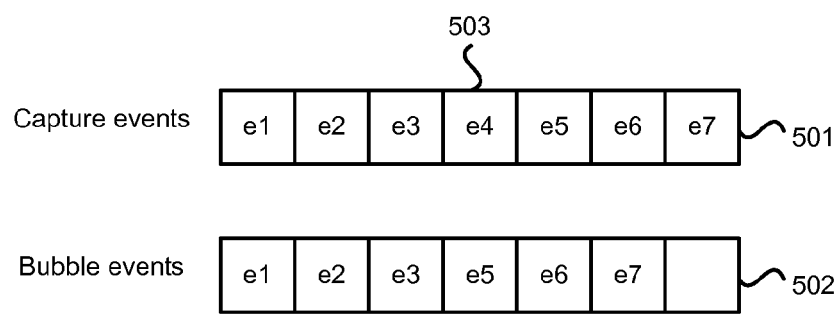
FIG. 13 illustrates a capture event stream and a corresponding bubble event stream with a known unobserved event.

A process for forming a training example at step 321 will now be described with reference to FIG. 13. Event stream 501 is recorded during the event capture phase of event handling and includes events e1 . . . e7. Event stream 502 is recorded during the bubble phase of event handling and includes events e1 . . . e7 but is missing event e4 503. The known missing event e4 provides an opportunity to form a training example. The training example uses the window size used for context based machine learning. Thus, for the example where the window size is 3, the training example forms a known instance using features from the event header message as well as features from previous events e3, e2, e1 and events e5, e6 and e7. The features are typically taken from the bubble stream events as these may provide the most useful context comparison when the training example is later used at runtime. However, features may also be taken from the capture event stream. In order to provide the most useful training example, the same parameters such as window size, features used, etc. are used for training, testing and at runtime. In addition, separate time thresholds may also be learned to determine what minimum elapsed intra-event time should be considered when evaluating the context of missing events. Furthermore, long intervals (inter event times) may be used to form negative training examples.

Figure 14:
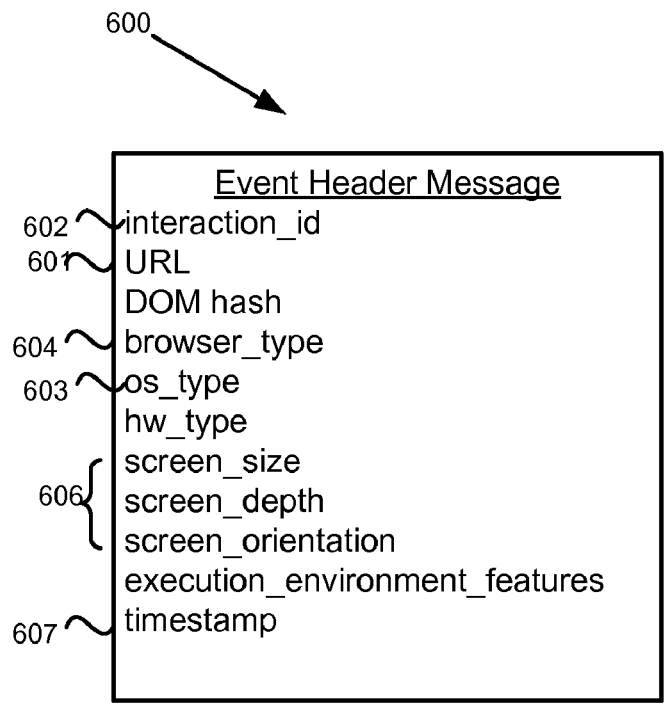
FIG. 14 illustrates an event header message.
Figure 15:
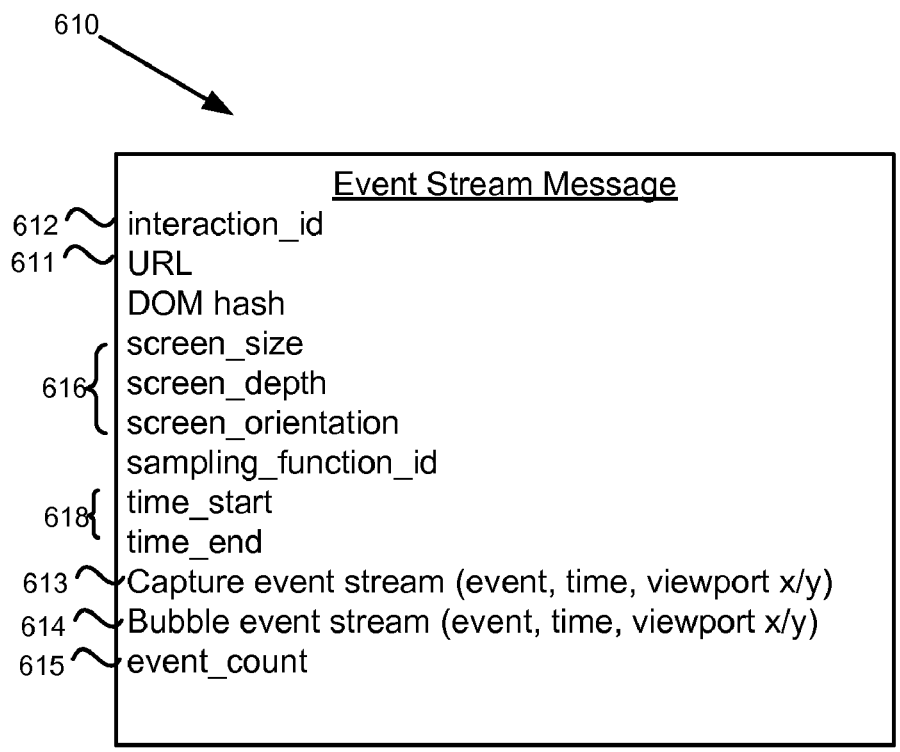
FIG. 15 illustrates an event stream message.

Context based learning for events may be dependent on many of the available features recorded during the event handling phases. An example of an event header message 600 is illustrated in FIG. 14 and an example of an event stream message 610 is illustrated in FIG. 15. The messages 600, 610 show a number of components that can be included, though in various embodiments, not all of these components may be required and additional components may be added. Primarily, an Interaction_ID 602, 612 uniquely identifies an interaction between the client and the web server and aids to identify a particular event stream. The event header message 600 and the event stream message 610 may also identify the Uniform Resource Locator (URL) 601, 611. Fixed parameters such as the operating system 603 and browser type 604 may form part of the event header message 600. Screen parameters 606, 616 such as the screen size, depth and orientation may be included in either or both of the event header message 600 or the event stream message 610. A capture event stream 613 and a bubble event stream 614 specifies the events recorded in respective event capture and bubbling phases during the web page interaction. Each event may be indicated by the event type, time and x/y location relative to the viewport. An event_count field 615 may indicate the total number of unique events observed by the event observer module including those events not included in the event stream message 610 due to a current sampling function excluding them. Timing parameters 618 may indicate the relevant period over which the event stream message 610 is current. A timestamp field 607 may be used for evaluating time intervals etc.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for inferring unobserved events generated during an interaction with a web page comprising:
   detecting at least one event for the web page on a first web browser;
   providing the at least one event to a database;
   determining at least one event context associated with the at least one event in the database; and
   inferring one or more undetected events from the event context.

2. The method according to claim 1 wherein the event context comprises an event stream.

3. The method according to claim 2 wherein the event stream comprises an event stream recorded for the web page on a second web browser.

4. The method according to claim 3 wherein the event stream comprises the at least one event.

5. The method according to claim 3 wherein the second web browser supports event capture and event bubbling.

6. The method according to claim 5 wherein the first web browser supports event bubbling and does not support event capture.

7. The method according to claim 2 wherein determining the at least one event context comprises retrieving an event stream that comprises the at least one event from the database.

8. The method according to claim 7 wherein the at least one event comprises a detected event stream and wherein the event context comprises an event stream comprising the detected event stream and at least one additional event.

9. The method according to claim 8 wherein inferring the one or more detected events comprises adding the at least one additional event to the detected event stream.

10. A system comprising:
    a server; and
    at least one application operatively associated with the server and configured to:
       record a first event stream of a first event stream type and a second event stream of a second event stream type from a first type of a web browser during an interaction on a web page; and
       provide the first event stream and the second event stream to the server;
    wherein the server is configured to:
       determine events present in the first event stream that are unobserved in the second event stream; and
       add at least a portion of the first event stream and the second event stream as a training context to a set of one or more training examples.

11. The system according to claim 10 wherein the first event stream type comprises an event capture stream type.

12. The system according to claim 10 wherein the second event stream type comprises an event bubbling stream type.

13. The system according to claim 10 wherein the first browser type supports event capture and event bubbling and wherein the second browser type supports event bubbling and does not support event capture.

14. The system according to claim 10 wherein the server is configured to record a training context of an unobserved event in the second event stream, the training context associating the unobserved event with one or more events adjacent the unobserved event in the first event stream.

15. The system according to claim 14 wherein the server is configured to:
    receive a third event stream of the second event stream type from a second type of a web browser during a further interaction on the web page; and
    compare the third event stream with one or more training contexts of the one or more training examples to infer one or more events unobserved in the third event stream.

16. The system according to claim 15 wherein the server is configured to:
    detect the one or more adjacent events in the third event stream;
    search the one or more training examples to retrieve a training context comprising the one or more adjacent events; and
    infer the unobserved event.

17. A non-transitory computer-readable storage medium comprising computer-executable instructions for execution by a first processor and a second processor in communication with the first processor, that, when executed:
    cause the first processor to:
       generate a first event stream; and
       provide the first event stream to the second processor; and
    cause the second processor to:
       receive the first event stream from the first processor; and
       determine at least one event that is identified in an event capture portion of the first event stream and that is not identified in an event bubbling portion of the first event stream.

18. The non-transitory computer-readable storage medium according to claim 17 further comprising instructions that, when executed, cause the second processor to store the at least one event.

19. The non-transitory computer-readable storage medium according to claim 18 further comprising instructions that, when executed, cause the second processor to store an association between the at least one event and the event bubbling portion.

20. The non-transitory computer-readable storage medium according to claim 19 further comprising instructions that, when executed, cause the second processor to identify the event bubbling portion in a second event stream and retrieve the stored at least one event associated with the event bubbling portion.

* * * * *